(12) United States Patent  
Hymack

(10) Patent No.: US 8,672,135 B1  
(45) Date of Patent: Mar. 18, 2014

(54) MULTI-FUNCTIONAL SURVIVAL KIT

(71) Applicant: Jeffery J Hymack, Longwood, FL (US)

(72) Inventor: Jeffery J Hymack, Longwood, FL (US)

( * ) Notice: Subject to any disclaimer, the term of this patent is extended or adjusted under 35 U.S.C. 154(b) by 0 days.

(21) Appl. No.: 14/088,042

(22) Filed: Nov. 22, 2013

Related U.S. Application Data

(60) Provisional application No. 61/729,710, filed on Nov. 26, 2012.

(51) Int. Cl.  
*B65D 69/00* (2006.01)

(52) U.S. Cl.  
USPC ............................ 206/542; 206/547; 206/577

(58) Field of Classification Search  
CPC .......... B65D 2571/00; B65D 2555/00; B65D 2539/00; B65D 2525/00  
USPC ......... 206/216, 217, 218, 223, 541, 542, 546, 206/547, 549, 576, 577  
See application file for complete search history.

(56) References Cited

U.S. PATENT DOCUMENTS

| | | | | |
|---|---|---|---|---|
| 3,154,063 A * | 10/1964 | White | ......................... | 124/20.2 |
| 5,651,523 A * | 7/1997 | Bridges | ...................... | 248/311.2 |
| 6,135,286 A * | 10/2000 | Strumor | ....................... | 206/573 |
| 7,300,171 B2 * | 11/2007 | Sutton | .......................... | 362/101 |
| 2009/0080180 A1 * | 3/2009 | Bertken | ....................... | 362/101 |
| 2013/0302496 A1 * | 11/2013 | Cowan | ......................... | 426/523 |

* cited by examiner

*Primary Examiner* — Jacob K Ackun

(57) ABSTRACT

A multi-functional survival kit includes a multi-part canteen for storing water, but that can also be broken down into a basin, a parabolic lid, and a cap. The basin, parabolic lid and cap can be used standalone or in conjunction with one another to provide various survival functions. A mirrored concave surface of the parabolic lid provides a means for starting a fire, while a basin handle of the basin allows the basin to be used for cooking purposes. The basin handle has a viewing space that can be used with the cap, which includes a compass, as a directional sight when the basin handle is pivoted ninety degrees. For transport, the canteen can be stored in a carrying case, which includes a strap to which a paracord can be attached. A pan, mess kit, and metal match are also included and stored in the carrying case.

20 Claims, 17 Drawing Sheets

MULTI-FUNCTIONAL SURVIVAL KIT

The current application claims a priority to the U.S. Provisional Patent application Ser. No. 61/729,710 filed on Nov. 26, 2012.

FIELD OF THE INVENTION

The present invention relates generally to survival gear. More specifically, the present invention is a multi-functional survival kit that incorporates a canteen having multi-functional components, an adaptable carrying case, and various other gear useful to survivalists. Furthermore, the present invention provides users with the means to perform basic actions required for survival such as starting fires, boiling water, and cooking food, amongst others.

BACKGROUND OF THE INVENTION

Survival in the wilderness is contingent on fulfilling several basic human needs. These needs generally encompass nourishment, warmth, and shelter. Although these requirements are basic, they are often the most difficult to acquire and maintain, particularly for inexperienced survivalists. Survivalists are faced with the problems of acquiring and cooking food, sanitizing water, creating fire, and sheltering themselves from the elements. These problems are easily circumvented with the proper survival gear although each problem often requires its own piece of gear. The present invention seeks to incorporate multiple individual components required for basic survival needs into a single survival kit.

Therefore it is the object of the present invention to provide a multi-functional survival kit that seeks to assist survivalists in fulfilling the basic human survival needs of nourishment, warmth, and shelter. The present invention includes a canteen, a pan, a mess kit, a metal match, a paracord, and a carrying case. The canteen serves as a vessel for storing drinking water, but can also be broken down into a basin, a parabolic lid, and a cap. The parabolic lid has a mirrored concave surface, which provides a first means for starting a fire, while the metal match provides a second means for starting a fire. The metal match includes a piece of ferrocerium and accompanying striker. The basin has a pivoting basin handle that can be fully extended, such that the basin can be used for cooking purposes once a fire has been started. The cap has a compass that can be used for directional orientation. The basin handle also has a viewing space, such that when the basin handle is pivoted at a ninety degree angle the basin handle can be used as a directional sight. The pan provides a user with a second means for preparing food. The mess kit includes essential items for consuming food once it has been prepared, such as a plate, a fork, and a spoon. The paracord is a versatile length of material that can be repurposed as a fishing line, used to construct a primitive bow, used to secure a shelter structure, etc. The present invention features a streamlined design through the carrying case, which enables the canteen, pan, mess kit, metal match, and paracord to be transported. The canteen, pan, and larger mess kit items are stored in a storage volume of the carrying case, while the metal match and smaller mess kit items are stored in a pocket of the carrying case. An opening on the top of the carrying case allows the cap to protrude through the carrying case, such that the compass is still accessible to the user and such that the user can drink from the canteen without removing the canteen from the carrying case. The carrying pouch also includes a shoulder strap around which the paracord may be wrapped for storage and convenient carrying.

DETAIL DESCRIPTIONS OF THE INVENTION

Figure 1:
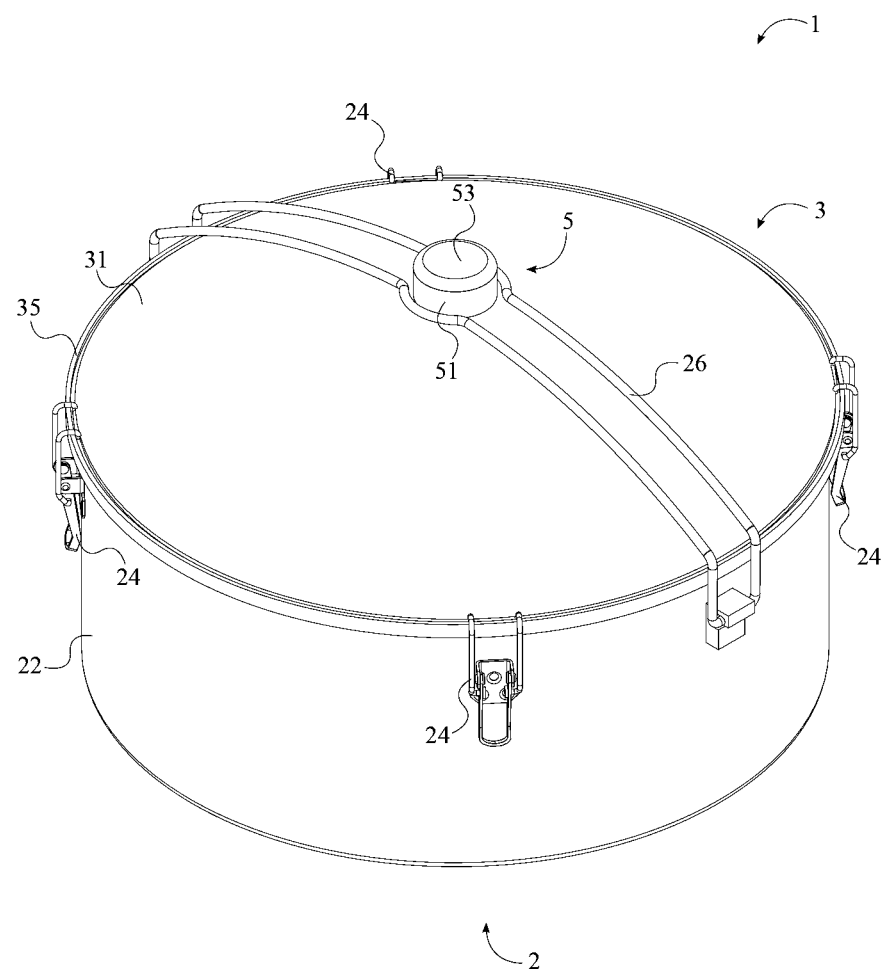
FIG. 1 is a perspective view of the canteen.

All illustrations of the drawings are for the purpose of describing selected versions of the present invention and are not intended to limit the scope of the present invention.

The present invention is a multi-functional survival kit that provides gear for fulfilling basic human needs. The multi-functional survival kit comprises a canteen 1, a pan 7, a mess kit 8, a metal match 9, a carrying case 6, and a paracord 95. In addition to storing water or another liquid, the canteen 1 is able to be disassembled, allowing the components of the canteen 1 to provide various functions, such as starting a fire or cooking meals. The pan 7 provides an additional means for preparing food, while the mess kit 8 includes essential items for consuming said food. The metal match 9 provides a secondary means of starting a fire and can be used at any time of day. The carrying case 6 allows the canteen 1, the pan 7, the mess kit 8, and the metal match 9 to be readily transported by the user, and provides a means for storing and transporting additional survival gear. The paracord 95 is attached to the carrying case 6 and provides the user with several survival functions if needed.

Figure 5:
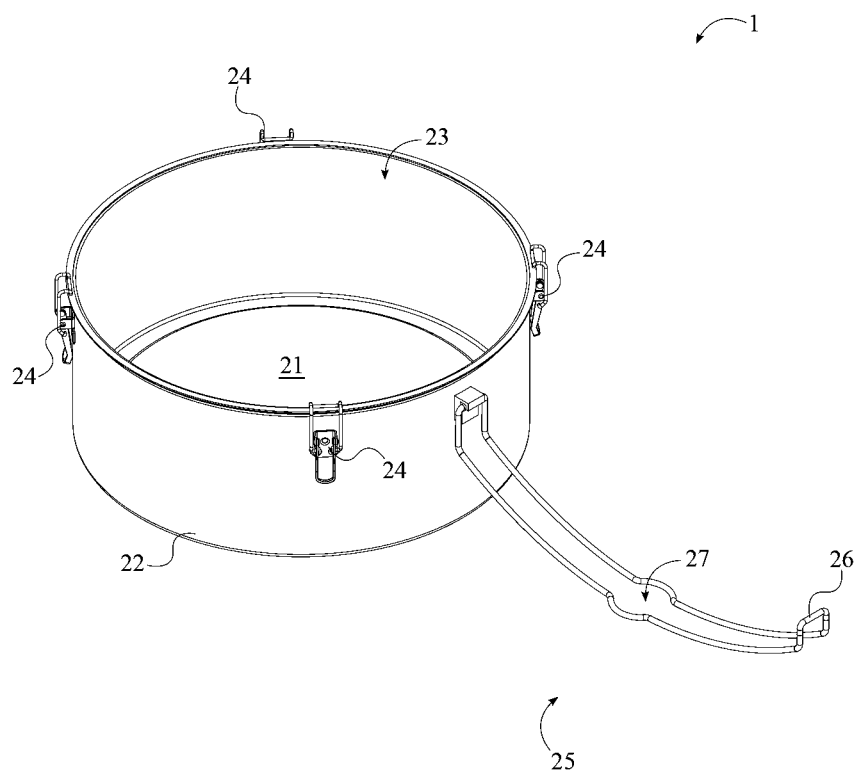
FIG. 5 is a perspective view of the basin.

The canteen 1 performs various survival functions in addition to storing water and comprises a basin 2, a parabolic lid 3, and a cap 5, as shown in FIG. 1. In reference to FIG. 5, the basin 2 is the main body of the canteen 1 and comprises a basin base 21, a lateral basin wall 22, a plurality of latches 24, and a basin handle 25. The lateral basin wall 22 is perimetrically and perpendicularly connected to the basin base 21, and, together, the basin base 21 and the lateral basin wall 22 delineate a basin receiving volume 23, which can be filled with the substance of the user's choice, such as water or food products. The basin base 21 determines the cross-sectional shape and area of the basin receiving volume 23, while the lateral basin wall 22 determines the depth of the basin 2. The plurality of latches 24 is connected around the lateral basin wall 22 opposite the basin receiving volume 23 and provide a means for securely attaching the parabolic lid 3 to the basin 2. Similarly, the basin handle 25 is pivotally connected to the lateral basin wall 22 opposite the basin receiving volume 23. The basin handle includes a locking member or locking assembly such that the basin handle can be locked in place at various positions, such as fully extended or at a ninety degree angle.

Figure 6:
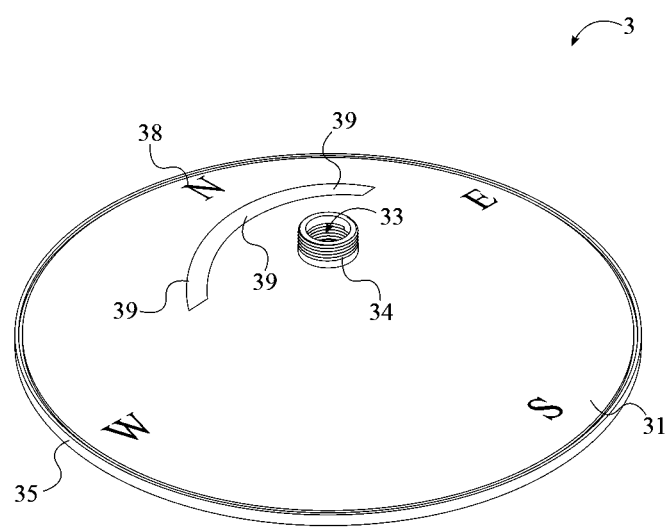
FIG. 6 is a top perspective view of the parabolic lid.
Figure 7:
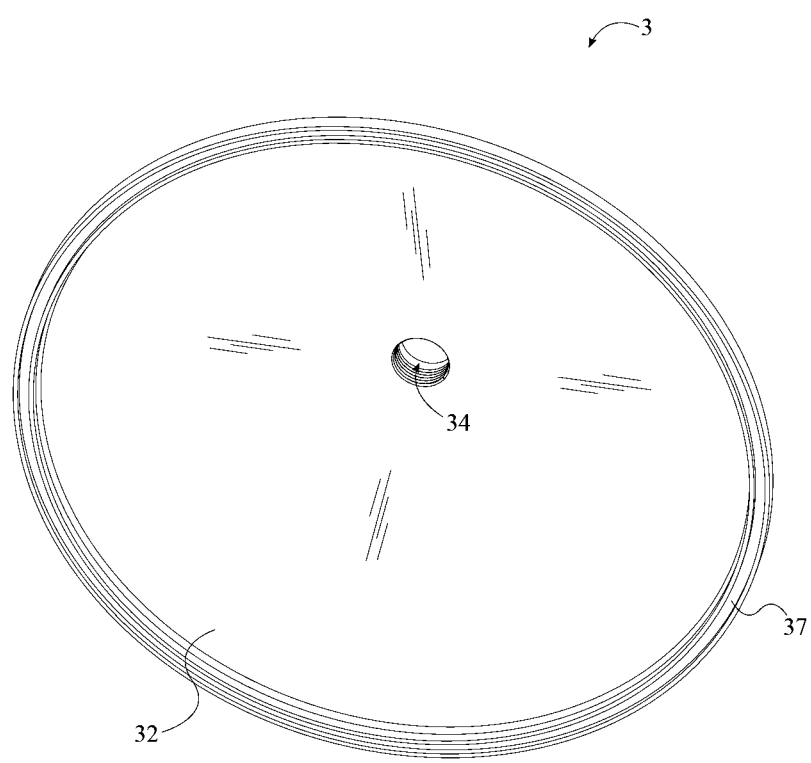
FIG. 7 is a bottom perspective view of the parabolic lid.
Figure 8:
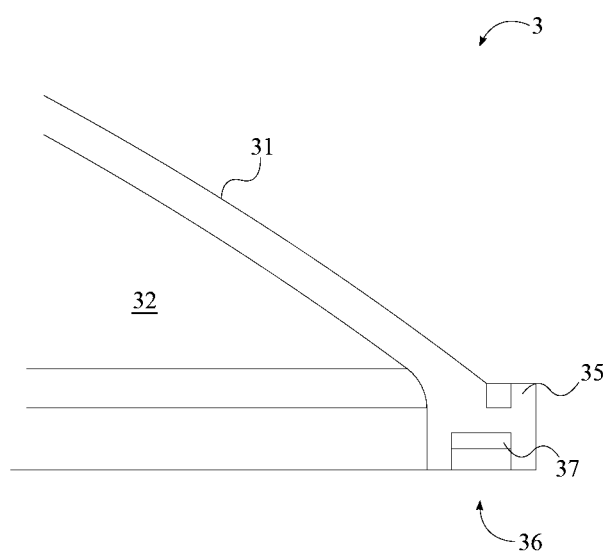
FIG. 8 is a sectional view of the parabolic lid.

In reference to FIG. 6-8, the parabolic lid 3 comprises a convex surface 31, a mirrored concave surface 32, a nipple 33, a lid opening 34, a lateral edge 35, a seal groove 36, a seal ring 37, a directional marking 38, and a plurality of sundial gradations 39. The convex surface 31 and the mirrored concave surface 32 are positioned opposite each other about the parabolic lid 3. The lateral edge 35 is positioned around the convex surface 31, while the seal groove 36 is positioned around the mirrored concave surface 32. Thus, the seal groove 36 is positioned opposite the lateral edge 35 about the parabolic lid 3. The nipple 33 is an extruded portion of the parabolic lid 3 and is centrally positioned on the convex surface 31, with the lid opening 34 traversing through the nipple 33. Both the directional marking 38 and the plurality of sundial gradations 39 are positioned on the convex surface 31 in between the nipple 33 and the lateral edge 35.

Figure 9:
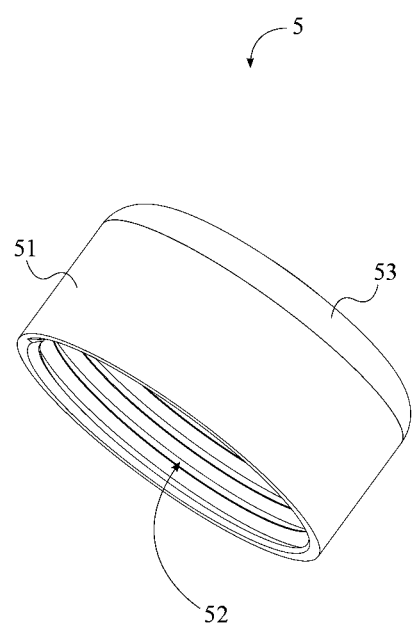
FIG. 9 is a perspective view of the cap.

In reference to FIG. 9, the cap 5 comprises a cap body 51, a cavity 52, and a compass 53. The cap body 51 is a short cylindrical body into which the cavity 52 is positioned, providing a hollowed recess such that the cap 5 can be fitted overtop of the nipple 33. The compass 53 is connected to the cap body 51 opposite the cavity 52 and provides the user with means for determining the cardinal directions, such that the user can properly orient them self.

Any of the basin 2, parabolic lid 3, or cap 5 can be used standalone or in conjunction with one another. When used alone, the basin 2 functions as pot for boiling water, cooking food, etc. The basin handle 25 can be pivoted such that the basin handle 25 extends outwards, away from the lateral basin wall 22. In this way, the user can maneuver the basin 2 overtop of a fire in order to heat the contents placed in the basin receiving volume 23. If desired, the parabolic lid 3 can be placed over top of the basin receiving volume 23 in order to retain heat within basin 2.

In isolation, the parabolic lid 3 can be used as an igniter to combust kindling in order to start a fire. The parabolic lid 3 is held by the user such that sunlight is projected onto the mirrored concave surface 32. The parabolic lid 3 is then manipulated by the user such that the reflected light is directed towards the kindling. More specifically, the parabolic lid 3 is positioned such that the focal point of the mirrored concave surface 32 is directed over the kindling, as the focal point is the intersection of all the reflected sun rays and thus the most concentrated point of energy. In an one embodiment of the present invention, the parabolic lid 3 further comprises a pair of forklike prongs positioned on the mirrored concave surface 32. Kindling is placed between the pair of forklike prongs in order to better focus sunlight and ignite the kindling. Additionally, the mirrored concave surface 32 of the parabolic lid 3 can be used as a signaling device. Using Morse code, sunlight can be reflected off of the mirrored concave surface 32 in order to broadcast distress signals or other messages.

The parabolic lid 3 can also be used as an amplifier of sound or radio waves. For example, a user can shout through the lid opening 34 with the mirrored concave surface 32 directed away from the user in order to amplify their voice if they are lost and attempting to locate another individual. Alternatively, a game call or whistle can be positioned into the lid opening 34 and used to amplify the game call's sound in order to attract animals within a larger radius. The parabolic lid 3 can also be used as an aid for amplifying faint sounds by holding the parabolic lid 3 up to the user's ear. Again, this can be beneficial when trying to locate another individual.

Figure 4:
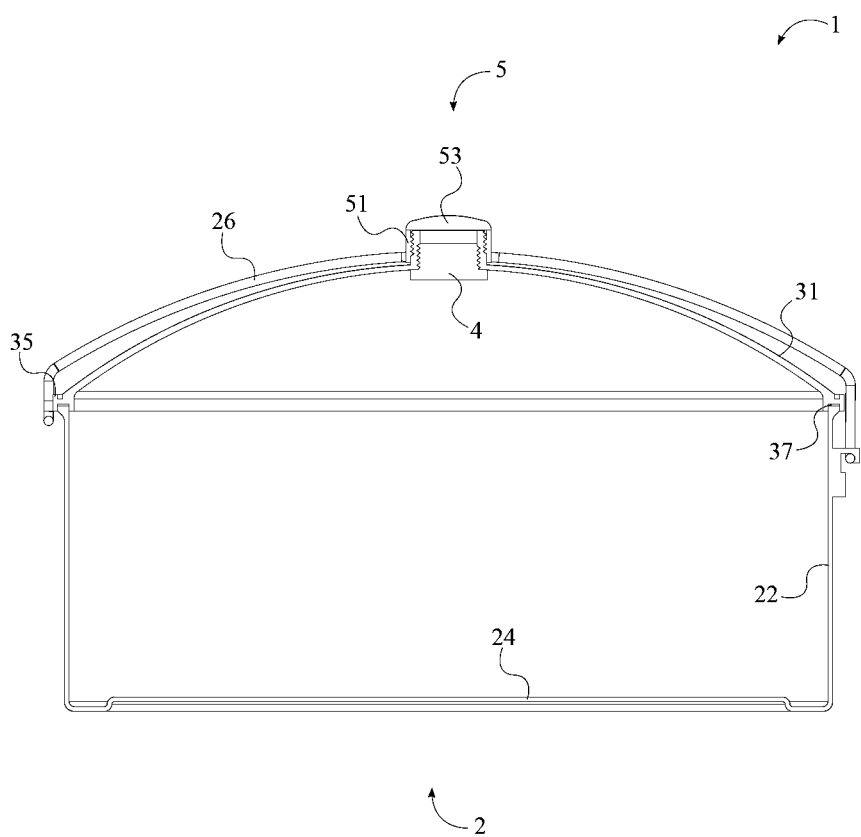
FIG. 4 is a right side sectional view of the canteen.

In reference to FIG. 4, the basin 2 and parabolic lid 3 can also be used in conjunction with one another to store water or another liquid. The parabolic lid 3 is positioned on the lateral basin wall 22 opposite the basin base 21, with the mirrored concave surface 32 being positioned adjacent to the basin receiving volume 23. The seal ring 37 is positioned within the seal groove 36 and the lateral basin wall 22 is positioned into the seal groove 36 such that the seal ring 37 perimetrically engages the lateral basin wall 22. The plurality of latches 24 is then positioned over the parabolic lid 3 such that the plurality of latches 24 engages the lateral edge 35. In this way, a liquid tight seal is created, thus preventing the user from losing valuable resources as the parabolic lid 3 is attached to the basin 2. The cap 5 is then attached to the nipple 33, the nipple 33 being positioned into the cavity 52, in order to fully enclose the basin receiving volume 23. The cap 5 can be readily removed as needed in order to access the contents stored within the basin receiving volume 23.

In the preferred embodiment of the present invention, the nipple 33 has a male threaded portion and the cap body 51 has a female threaded portion about the cavity 52. In this way, the cap 5 can be securely screwed onto the nipple 33 in order to ensure a liquid tight seal. However, it is also possible for the cap 5 to be attached to the nipple 33 in any other way, such as through a snap or press fit connection. If the basin 2 and parabolic lid 3 are not being used to retain a fluid or other substance, then the cap 5 may be detached such that the compass 53 is more readily accessible to the user.

The canteen 1 may further comprise a filter 4 for when the basin 2 and parabolic lid 3 are used to retain liquid, as shown in FIG. 4. The filter 4 is attached to the nipple 33 and positioned into the lid opening 34 opposite the convex surface 31. Similar to the cap 5, the filter 4 is preferably attached to the nipple 33 through a threaded connection; the filter 4 having a male threaded portion and the nipple 33 having a female threaded portion. Again, similar to the cap 5, it is possible for the filter 4 to be attached to the nipple 33 in any other way, such as through a snap or press fit connection. The filter 4 is used to sanitize water collected from natural water sources (e.g. rivers, streams) by removing impurities such as sediment and pathogens from the water through at least one screen. Multiple screens of various meshing sizes can be used to achieve the desired level of filtration. In order to use the filter 4, the filter 4 is attached to the nipple 33, and the canteen 1 is submerged under water. In this way, the basin receiving volume 23 of the canteen 1 is filled as water passes through the lid opening 34 and the filter 4, while sediment is prevented from passing through the filter 4. The use of the filter 4 allows the user to remain hydrated without the risk of becoming sick from impure water. The filter 4 can be designed to provide one or more methods of filtration known in the art of water filters, such as granular-activated carbon filtration.

Figure 2:
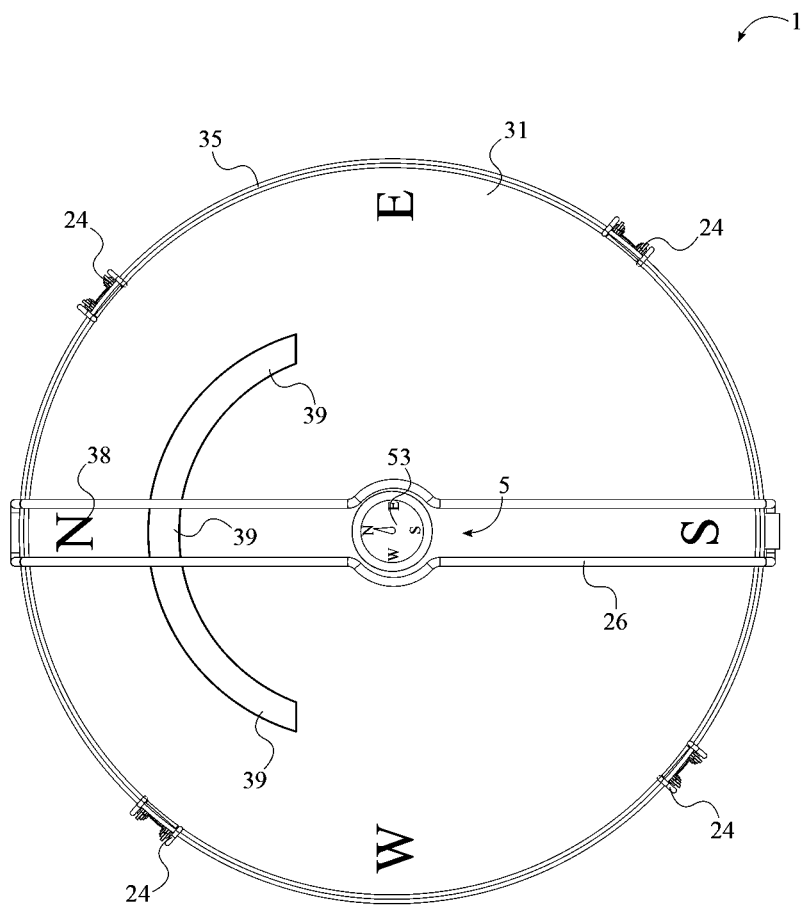
FIG. 2 is a top plan view of the canteen.

In reference to FIG. 2, the parabolic lid 3 and the cap 5 can also be used in conjunction with one another. When the cap 5 is attached to the nipple 33, the directional marking 38 on the parabolic lid 3 can be aligned with a reference point on the compass 53. The plurality of sundial gradations 39 is aligned on the parabolic lid 3 with respect to the directional marking 38 such that when the directional marking 38 is aligned with the reference point, the plurality of sundial gradations 39 can be used to tell the time of day. For example, the directional marking 38 could be a symbol for north, positioned midway along the plurality of sundial gradations 39, such that when the directional marking 38 is aligned with the north reference point on the compass 53, the plurality of sundial gradations 39 traverses in an arc from west to east. A thin elongated member can then be held centrally over the compass 53 and used to tell the time of day by observing where the shadow of the elongated member falls on the plurality of sundial gradations 39.

As another example, the directional marking 38 could be a symbol for south, positioned on the parabolic lid 3 opposite the plurality of sundial gradations 39, but still aligned with the midpoint of the plurality of sundial gradations 39. In this way, when the directional marking 38 is aligned with the south reference point on the compass 53, the plurality of sundial gradations 39 traverses in an arc from west to east. It is possible for additional directional markings to be used as well for aesthetic purposes. Additionally, the plurality of sundial gradations 39 is evenly spaced on the parabolic lid 3, such that the user can readily and accurately determine the time of day.

Figure 3:
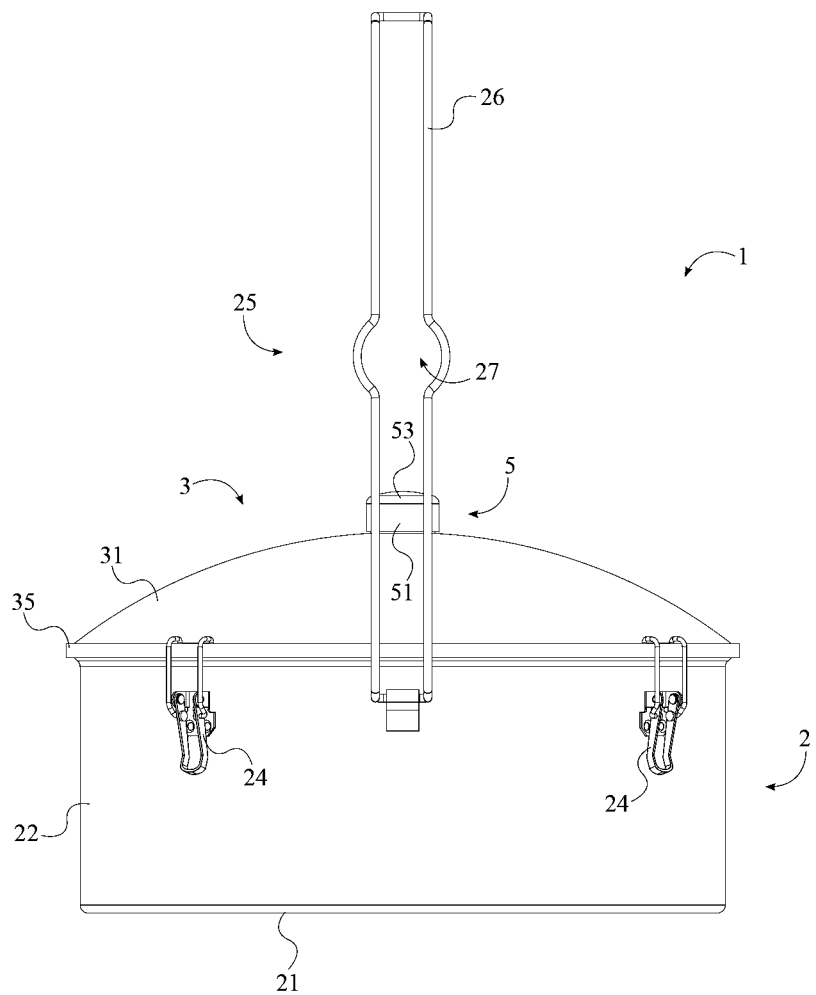
FIG. 3 is a rear elevational view of the canteen with the basin handle positioned upwards.

In reference to FIG. 3, the basin 2, the parabolic lid 3, and the cap 5 can also be used together as a directional sight. The basin handle 25 of the basin 2 comprises a handle body 26 and a viewing space 27; the handle body 26 being pivotally connected to the lateral basin wall 22 and the viewing space 27 traversing through the handle body 26. The handle body 26 is directed upwards at a ninety degree angle and locked in place. The parabolic lid 3 is then placed on top of the basin 2 with the cap 5 attached. The parabolic lid 3 or cap 5 is then rotated until the desired reference point on the compass 53 is aligned with the viewing space 27. The user now knows the direction they are traveling in and can glance through the viewing space 27 to find a reference mark in order to ensure that he or she continues traveling in the correct direction without the continued use of the compass 53. For example, if the user wishes to travel north, then the north reference point on the compass 53 is aligned with the viewing space 27 and the user faces the north direction. The user then finds a noticeable landmark such as an odd shaped rock or large tree. Once the user reaches the chosen landmark, he or she can then repeat the process, finding a new landmark in the direction of travel.

Figure 10:
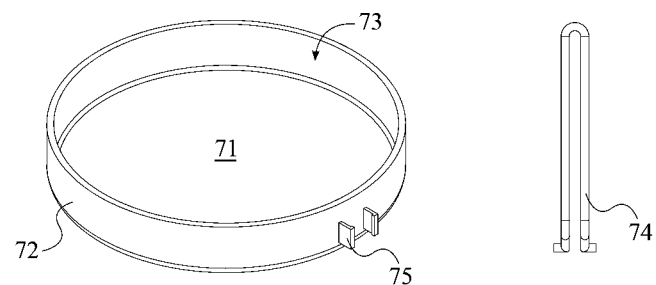
FIG. 10 is a perspective view of the pan with the pan handle detached from the lateral pan wall.
Figure 11:
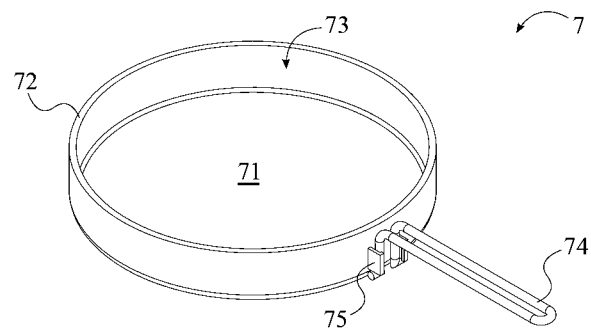
FIG. 11 is a perspective view of the pan with the pan handle attached to the lateral pan wall.
Figure 12:
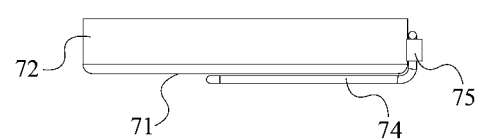
FIG. 12 is a right side elevational view of the pan with the pan handle stored beneath the pan base.

In reference to FIG. 10-12, the pan 7 provides the user with an alternative means for preparing food. The pan 7 comprises a pan base 71, a lateral pan wall 72, a pan handle 74, and a handle connector 75. The lateral pan wall 72 is perimetrically connected to the pan base 71 and may be either tapered in towards the pan base 71, curved downwards towards the pan base 71, or be perpendicular to the pan base 71. Together, the pan base 71 and the lateral pan wall 72 delineate a pan receiving volume 73. The pan base 71 is appropriately sized such that the basin 2 may rest within the pan receiving volume 73. The handle connector 75 is connected to the lateral pan wall 72 opposite the pan receiving volume 73 and provides a means for attaching the pan handle 74 to the lateral pan wall 72. The pan handle 74 can be attached to the pair of extrusions in two different positions. The first position is with the pan handle 74 directed outwards, away from the lateral pan wall 72. In this way, the pan handle 74 can be used to maneuver the pan 7 while cooking. In the second position, the basin handle 25 is positioned adjacent to the pan base 71 opposite the pan receiving volume 73, such that the pan handle 74 rests underneath the pan base 71. This allows the pan 7 to be more compactly stored. In the preferred embodiment of the present invention, the handle connector 75 is a pair of vertical extruded tabs into which the pan handle 74 is slotted; however, it is possible for the handle connector 75 to provide any other means of connection.

Figure 13:
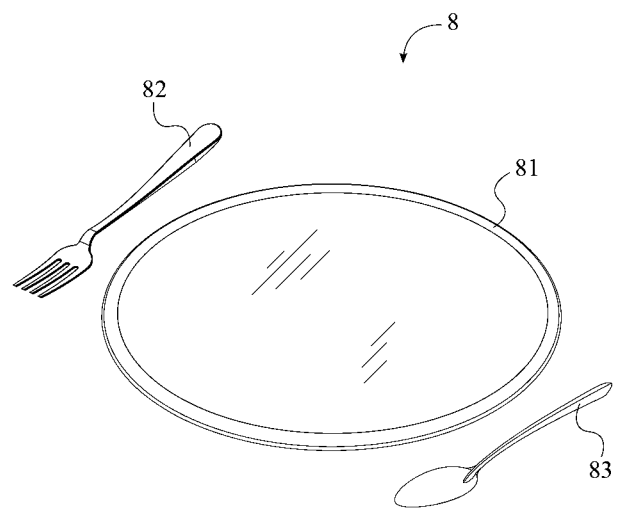
FIG. 13 is a perspective view of the mess kit.

In reference to FIG. 13, the mess kit 8 provides the user with essential items for dinning. The mess kit 8 comprises a plate 81, a fork 82, and a spoon 83. The plate 81 is an essentially flat piece of material and comprises a mirrored surface, such that the plate 81 can be used as a signaling device in addition to the mirrored concave surface 32 of the parabolic lid 3. The plate 81 has a diameter that is slightly larger than that of the lateral basin wall 22 and lateral pan wall 72, such that the plate 81 can also be used as a lid when cooking. The mess kit 8 may also comprise a knife, however, in many cases a survivalist will carry a separate survival knife.

Figure 14:
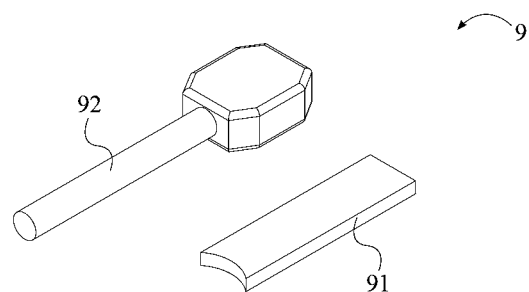
FIG. 14 is a perspective view of the metal match.

In reference to FIG. 14, the metal match 9 provides a secondary igniter in addition to the mirrored concave surface 32 of the parabolic lid 3. The metal match 9 comprises a striker 91 and a strike pad 92. The striker 91 is a hard piece of metal, while the strike pad 92 is a length of material having a composition such that when the striker 91 is scraped along the strike pad 92 hot sparks are produced. In the preferred embodiment of the present invention, the strike pad 92 is a piece of ferrocerium; however, it is possible for the strike pad 92 to be manufactured using any other material(s) capable of producing similar effects when struck by the striker 91.

Figure 15:
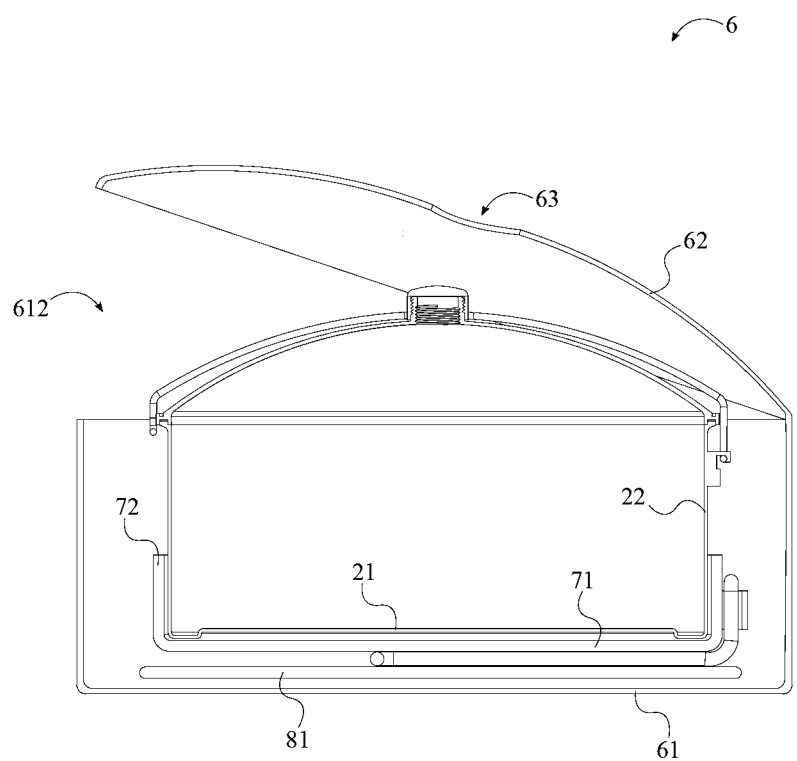
FIG. 15 is a right side sectional view showing the canteen, plate, and pan positioned within the storage volume of the carrying case.

In reference to FIG. 15, the carrying case 6 is used to hold and transport the canteen 1, the pan 7, the mess kit 8, and the metal match 9. The carrying case 6 comprises a basin portion 61, a lid portion 62, a pocket 67, a belt loop 64, a nipple opening 63, a strap 65, a strap pad 68, and a plurality of fastening bands 69. The basin portion 61 and the lid portion 62 form the body of the carrying case 6 and, together, the basin base 21 portion and the lid portion 62 delineate a storage volume 612. The basin portion 61 is hingedly connected to the lid portion 62, such that the basin portion 61 and the lid portion 62 are permanently connected along a connecting segment. The basin portion 61 and the lid portion 62 are then separably attached along a remaining segment by a means of connection such as a zipper. In this way, the storage volume 612 can be securely shut, yet remains readily accessible to the user. The pocket 67 is connected to either the base portion or the lid portion 62 and can be either positioned opposite the storage volume 612 or within the storage volume 612. It is also possible for the carrying case 6 to comprise additional pockets.

Figure 16:
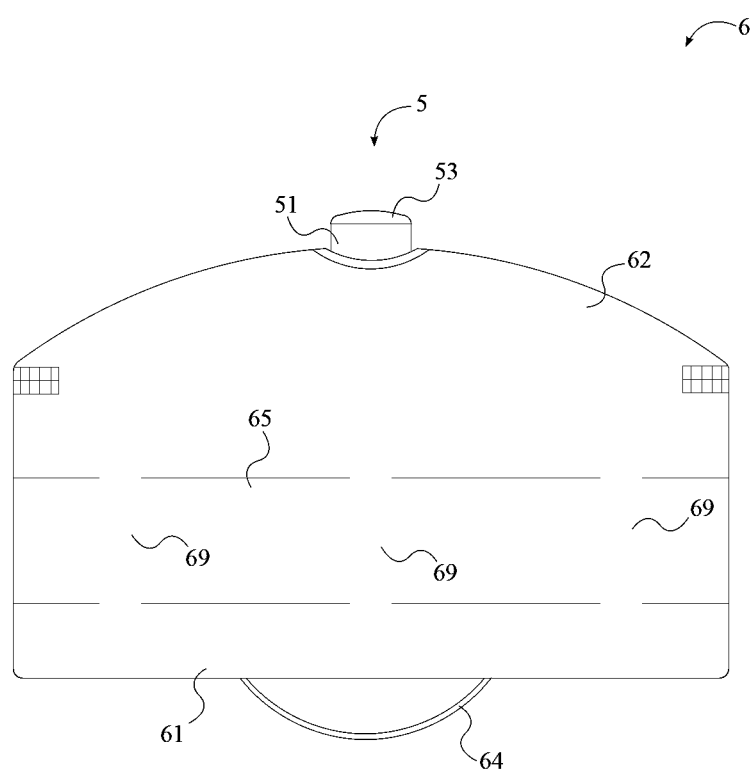
FIG. 16 is a rear elevational view of the canteen positioned within the carrying case.
Figure 17:
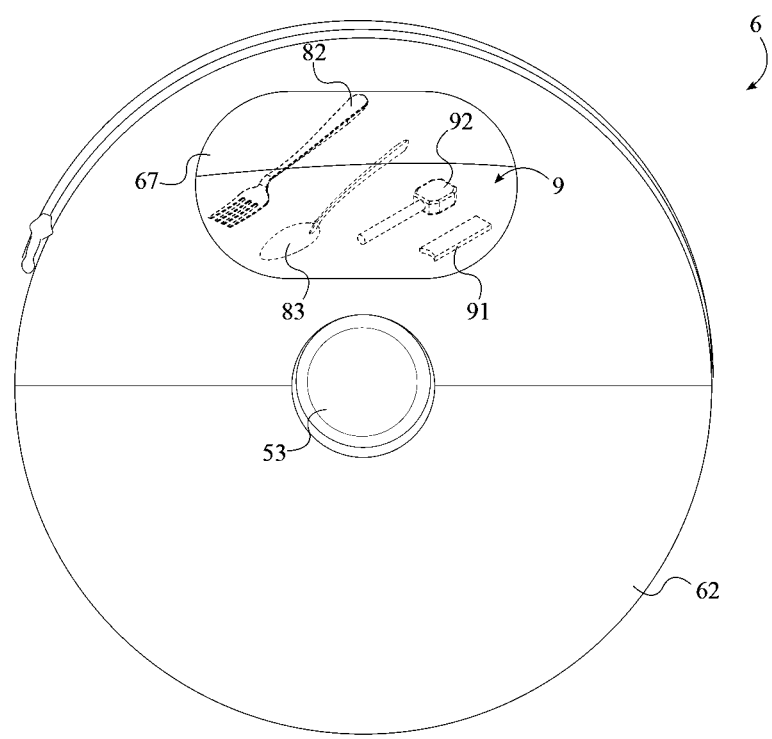
FIG. 17 is a top plan view of the carrying case showing the fork, spoon, and metal match positioned within the pocket of the carrying case.

When the canteen 1 is positioned within the storage volume 612, the basin portion 61 encompasses the basin 2, the lid portion 62 encompasses the parabolic lid 3, and the nipple 33 traverses through the nipple opening 63, as depicted in FIG. 16. As such, the nipple opening 63 is centrally positioned on the lid portion 62. The nipple opening 63 allows the nipple 33 to protrude through the carrying case 6, such that the compass 53 is accessible to the user while the canteen 1 is positioned within the carrying case 6. Additionally, in this way the cap 5 can be removed from the parabolic lid 3 in order to drink from the canteen 1 while the canteen 1 is positioned within the carrying case 6. The pan 7 is positioned within the storage volume 612 in between the basin 2 and the basin portion 61, with the basin 2 resting within the pan receiving volume 73. The plate 81 is positioned below the pan 7, in between the pan base 71 and the basin portion 61. The fork 82, the spoon 83, and the metal match 9 are then positioned within the pocket 67, as shown in FIG. 17, which can be secured closed using any means. Additional survival gear may also be stored in the pocket 67, such as a whistle, thermal blanket, or cutting tools.

In reference to FIG. 16, the belt loop 64 and the strap 65 provide the user with two different means for transporting the carrying case 6. The belt loop 64 is positioned on the bottom of the basin portion 61 opposite the storage volume 612, and allows the carrying case 6 to be attached to a belt of the user or to any other length of material. The strap 65 is attached to the basin portion 61 by the plurality of fastening bands 69, such that the strap 65 can be removed if the user chooses to transport the carrying case 6 using the belt loop 64. The plurality of fastening bands 69 is positioned around the basin portion 61 and is attached to the basin 2 opposite the storage volume 612. The strap 65 can be threaded around the basin portion 61 in between the basin portion 61 and the plurality of fastening bands 69, or the plurality of fastening bands 69 can first be removed from the basin portion 61 and then reattached overtop of the strap 65 in order to secure the strap 65 to the basin portion 61.

In the preferred embodiment of the present invention, each of the plurality of fastening bands 69 comprises a pair of female snap discs positioned opposite each other. The pair of female snap discs of each of the fastening bands engages a pair of male snap discs connected to the basin portion 61 in order to attach the plurality of fastening bands 69 to the basin portion 61. It is also possible for the plurality of fastening bands 69 to be attached to the basin portion 61 in any other way.

Figure 18:
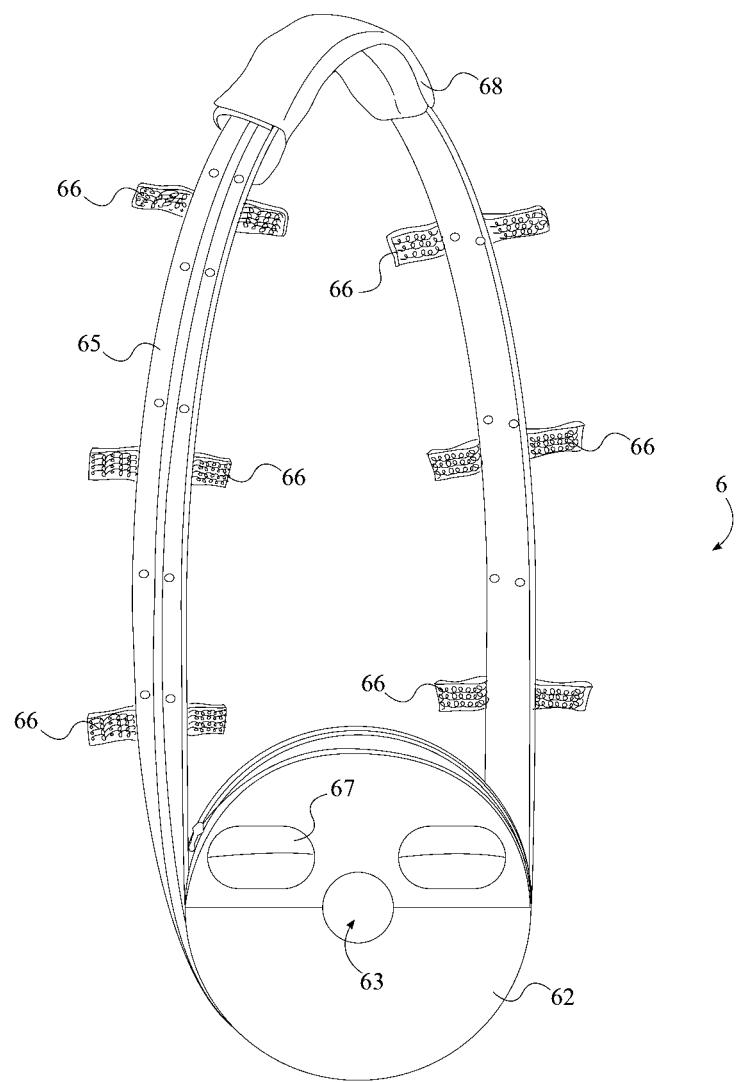
FIG. 18 is a perspective view of the carrying case.

In reference to FIG. 18, the strap pad 68 is attached to the strap 65 and provides a cushioned support when the strap 65 is worn around the shoulder of the user. In the preferred embodiment of the present invention, the strap pad 68 comprises a plurality of female snap discs and a plurality of male snap discs. The plurality of female snap discs and the plurality of male snap discs are positioned opposite each other across the strap pad 68 and on opposite sides of the strap pad 68. In this way, the strap pad 68 is wrapped around the strap 65 such that the plurality of male snap discs engages the plurality of female snap discs, thus securing the strap pad 68 to the strap 65. It is also possible for the strap pad 68 to be attached to the strap 65 using any other means of attachment. The strap pad 68 can also be used standalone as a pot holder or can be securely positioned around either the basin handle 25 or the pan handle 74 in order to safely maneuver the basin 2 or pan 7 while cooking. As such, the strap pad 68 is ideally manufactured from an insulated material or materials.

Figure 19:
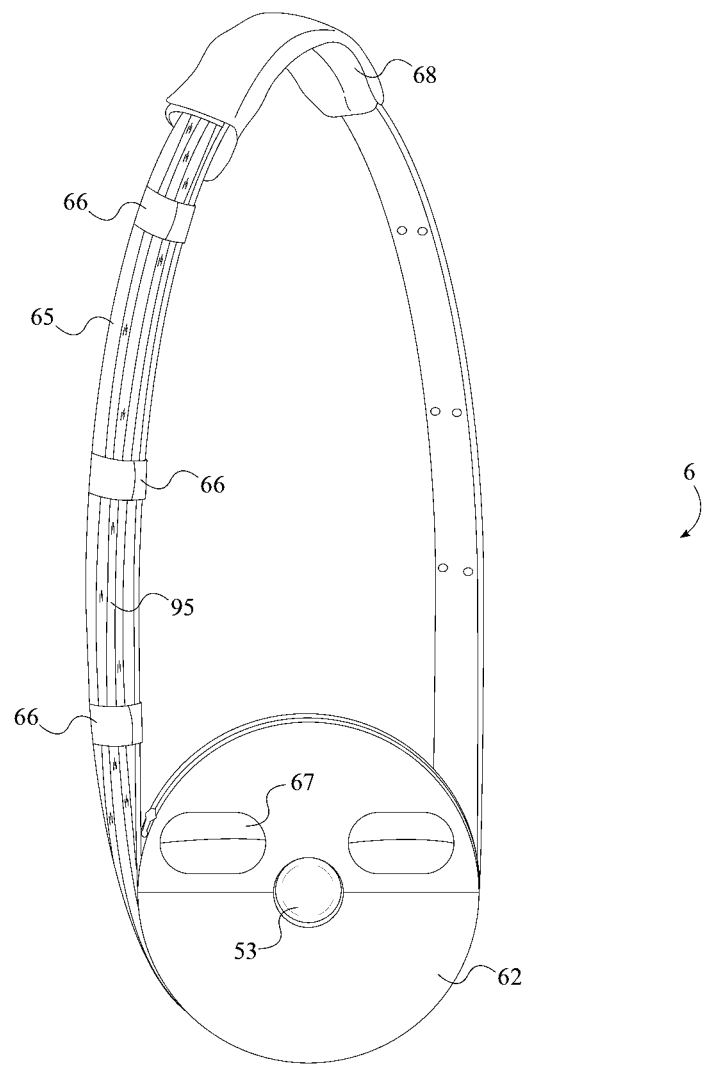
FIG. 19 is a perspective view of the carrying case with the canteen positioned within the storage volume and the paracord attached to the strap.
Figure 20:
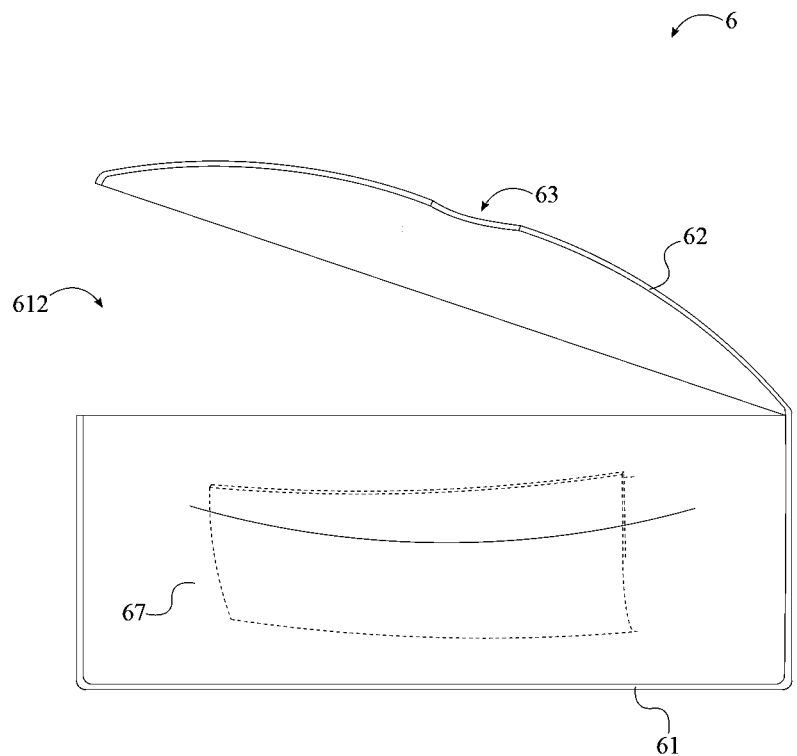
FIG. 20 is a right side sectional view of the carrying case showing a thermal blanket being stored within the internal pocket.

In reference to FIG. 18-19, the strap 65 comprises a plurality of fasteners 66; the plurality of fasteners 66 being positioned along the strap 65. The plurality of fasteners 66 provides a means for attaching the paracord 95 along the strap 65. In the preferred embodiment of the present invention, each of the plurality of fasteners 66 is a hook and loop strap 65 connected perpendicular to the strap 65. The paracord 95 is positioned along the strap 65 and each of the plurality of fasteners 66 is then wrapped around the paracord 95, with the hook portion engaging the loop portion. It is also possible for the plurality of fasteners 66 to provide any other means of attachment between the strap 65 and the paracord 95.

In the preferred embodiment of the present invention, the paracord 95 comprises an external sheath that houses a plurality of internal yarns. The paracord 95 may vary with regard to specifications including, but not limited to, elasticity and other material properties, number of internal yarns, and design/texture of the external sheath.

In an alternative embodiment of the present invention, the plurality of latches 24 is substituted for a plurality of extruded tabs. The plurality of extruded tabs is connected to the lateral basin wall 22 opposite the basin receiving volume 23. Additionally, the plurality of extruded tabs is evenly positioned around the lateral basin wall 22 opposite the basin base 21. A pair of apertures being positioned opposite each other across the later basin 2 wall traverses through the plurality of extruded tabs. The canteen 1 further comprises a wire handle that can be positioned through the pair of apertures, such that the wire handle can be used to lift the basin 2 when cooking. The wire handle can be removed and stored within the carrying case 6 when not in use.

In the alternative embodiment, the canteen 1 also further comprises a parabolic bridge. The parabolic bridge comprises a pair of clips and a cap 5 opening. The pair of clips are positioned opposite each other along the parabolic bridge, while the cap 5 opening is centrally positioned on the parabolic bridge. When the parabolic lid 3 is positioned onto the lateral wall of the basin 2, the parabolic bridge is positioned across the parabolic lid 3 with the nipple 33 traversing through the cap 5 opening. The cap 5 opening may be threaded to match the threads of the nipple 33. The pair of clips engages the plurality of extruded tabs in order to secure the parabolic lid 3 to the basin 2. The cap 5 can then be attached to the nipple 33; clamping the parabolic bridge in between the cap 5 and the parabolic lid 3 in order to further secure the position of the parabolic bridge.

In summary, the present invention is designed to fulfill the most basic of human needs in survival situations. Human needs in survival situations generally encompass finding and securing nourishment, warmth, and shelter. The paracord 95 of the present invention is versatile and is capable of fulfilling multiple human needs. The internal yarns of the parachute cord are able to be repurposed for use as fishing lines or as part of a primitively constructed bow for hunting. The paracord 95 may also be used to secure temporary makeshift shelter. A user is able to gather water into the basin 2 and then boil the water for safe usage. The basin 2 in conjunction with the parabolic lid 3 and the cap 5 forms the canteen 1 for drinking water, as the basin 2 and the parabolic mirror form a liquid tight seal, as well as the parabolic lid 3 and the cap 5. The user is only required to unscrew the cap 5 from the parabolic lid 3 to drink from the canteen 1. The pan 7 may be used to cook fish, game, and other sources of food that a user has gathered. The user is provided two fire starters in the metal match 9 and parabolic lid 3. The mirrored concave surface 32 of the parabolic lid 3 is used to project and focus sunlight onto a single point in order to light prepared tinder and ignite a fire. The metal match 9 may be used to ignite a fire as well by scraping the striker 91 along the strike pad 92 to produce a large number of hot sparks; the sparks being directed onto prepared tinder to ignite a fire.

Although the invention has been explained in relation to its preferred embodiment, it is to be understood that many other possible modifications and variations can be made without departing from the spirit and scope of the invention as hereinafter claimed.

What is claimed is:

1. A multi-functional survival kit comprises:
   a canteen;
   the canteen comprises a basin, a parabolic lid, and a cap;
   the basin comprises a basin base, a lateral basin wall, and a basin handle;
   the parabolic lid comprises a convex surface, a mirrored concave surface, a nipple, and a lid opening;
   the cap comprises a cap body, a cavity, and a compass;
   the lateral basin wall being perimetrically connected to the basin base;

the basin base and the lateral basin wall delineating a basin receiving volume;
the basin handle being connected to the lateral basin wall opposite the basin receiving volume;
the convex surface and the mirrored concave surface being positioned opposite each other about the parabolic lid;
the nipple being centrally positioned on the convex surface;
the lid opening traversing through the nipple;
the cavity being positioned into the cap body; and
the compass being concentrically positioned on the cap body opposite the cavity.

2. The multi-functional survival kit as claimed in claim 1 comprises:
the parabolic lid being positioned on the lateral basin wall opposite the basin base;
the mirrored concave surface being positioned adjacent to the basin receiving volume;
the cap body being attached to the nipple; and
the nipple being positioned into the cavity.

3. The multi-functional survival kit as claimed in claim 2 comprises:
the basin further comprises a plurality of latches;
the parabolic lid further comprises a lateral edge;
the plurality of latches being connected around the lateral basin wall opposite the basin receiving volume;
the lateral edge being positioned around the convex surface; and
the plurality of latches engaging the lateral edge, wherein the parabolic lid is attached to the lateral basin wall.

4. The multi-functional survival kit as claimed in claim 2 comprises:
the parabolic lid further comprises a seal groove and a seal ring;
the seal groove being positioned opposite the lateral edge about the parabolic lid;
the seal groove being positioned around the mirrored concave surface;
the seal ring being positioned within the seal groove; and
the seal ring perimetrically engaging the lateral basin wall.

5. The multi-functional survival kit as claimed in claim 1 comprises:
the canteen further comprises a filter;
the filter being attached to the nipple; and
the filter being positioned into the lid opening.

6. The multi-functional survival kit as claimed in claim 1 comprises:
the parabolic lid further comprises a directional marking and a plurality of sundial gradations;
the directional marking and the plurality of sundial gradations being positioned on the convex surface about the nipple; and
the plurality of sundial gradations being evenly spaced.

7. The multi-functional survival kit as claimed in claim 1 comprises:
the basin handle comprises a handle body and a viewing space;
the handle body being pivotally connected to the lateral basin wall, wherein the handle body can be locked in position at ninety degree intervals; and
the viewing space traversing through the handle body.

8. The multi-functional survival kit as claimed in claim 1 comprises:
a carrying case;
the carrying case comprises a basin portion, a lid portion, and a nipple opening;
the basin portion being hingedly connected to the lid portion;
the basin portion and the lid portion delineating a storage volume; and
the nipple opening being centrally positioned on the lid portion.

9. The multi-functional survival kit as claimed in claim 8 comprises:
the canteen being positioned within the storage volume;
the basin portion encompassing the basin;
the lid portion encompassing the parabolic lid; and
the nipple traversing through the nipple opening.

10. The multi-functional survival kit as claimed in claim 8 comprises:
a pan;
the pan comprises a pan base, a lateral pan wall, a handle connector, and a pan handle;
the lateral pan wall being perimetrically connected to the pan base;
the pan base and the lateral pan wall delineating a pan receiving volume;
the handle being connected to the lateral pan wall opposite the pan receiving volume; and
the pan handle being attached to the handle connector.

11. The multi-functional survival kit as claimed in claim 10 comprises:
the pan handle being positioned adjacent to the pan base opposite the pan receiving volume;
the canteen being positioned within the storage volume; and
the pan being positioned within the storage volume in between the basin and the basin portion.

12. The multi-functional survival kit as claimed in claim 8 comprises:
a mess kit; and
the mess kit comprises a plate, a fork, and a spoon.

13. The multi-functional survival kit as claimed in claim 12 comprises:
the carrying case further comprises a pocket;
the pocket being positioned on either the lid portion or the basin portion;
the fork and the spoon being positioned within the pocket;
the canteen being positioned within the storage volume; and
the plate being positioned within the storage volume in between the basin base and the basin portion.

14. The multi-functional survival kit as claimed in claim 8 comprises:
a metal match; and
the metal match comprises a strike pad and a striker, wherein the striker can be scraped along the strike pad in order to produce hot sparks.

15. The multi-functional survival kit as claimed in claim 14 comprises:
the carrying case further comprises a pocket;
the pocket being positioned on either the lid portion or the basin portion; and
the metal match being positioned within the pocket.

16. The multi-functional survival kit as claimed in claim 8 comprises:
the carrying case further comprises a belt loop; and
the belt loop being centrally positioned on the basin portion opposite the storage volume.

17. The multi-functional survival kit as claimed in claim 8 comprises:
the carrying case further comprises a strap; and
the strap being attached to the basin portion.

18. The multi-functional survival kit as claimed in claim 17 comprises:

the carrying case further comprises a plurality of fastening bands;

the plurality of fastening bands being attached to the basin portion opposite the storage volume;

the plurality of fastening bands being positioned around the basin portion; and the strap being positioned in between the basin portion and the plurality of fastening bands.

19. The multi-functional survival kit as claimed in claim 17 comprises:

the carrying case further comprises a strap pad; and the strap pad being attached to the strap.

20. The multi-functional survival kit as claimed in claim 17 comprises:

a paracord;

the strap comprises a plurality of fasteners;

the plurality of fasteners being positioned along the strap; and the paracord being attached to the strap by the plurality of fasteners.

\* \* \* \* \*